United States Patent
Kuhlburger et al.

(10) Patent No.: US 7,067,598 B2
(45) Date of Patent: Jun. 27, 2006

(54) PROCESS FOR THE CONTINUOUS GAS-PHASE (CO-)POLYMERISATION OF OLEFINS IN A FLUIDISED BED REACTOR

(75) Inventors: Jean-Jacques Kuhlburger, Martigues (FR); Kenneth John Rowley, Shropshire (GB)

(73) Assignee: BP Chemicals Limited, London (GB)

( * ) Notice: Subject to any disclaimer, the term of this patent is extended or adjusted under 35 U.S.C. 154(b) by 153 days.

(21) Appl. No.: 10/432,032

(22) PCT Filed: Nov. 16, 2001

(86) PCT No.: PCT/GB01/05078

§ 371 (c)(1),
(2), (4) Date: Sep. 11, 2003

(87) PCT Pub. No.: WO02/40556

PCT Pub. Date: May 23, 2002

(65) Prior Publication Data

US 2004/0030065 A1     Feb. 12, 2004

(30) Foreign Application Priority Data

Nov. 20, 2000  (EP)  .................................. 00430030

(51) Int. Cl.
*C08F 4/69*     (2006.01)
*C08F 2/34*     (2006.01)

(52) U.S. Cl. ...................... 526/105; 526/106; 526/129; 526/901

(58) Field of Classification Search ................ 526/105, 526/106, 83, 84, 129, 901
See application file for complete search history.

(56) References Cited

U.S. PATENT DOCUMENTS 4,049,896 A * 9/1977 Rekers et al. ............... 526/129
5,155,186 A * 10/1992 Hogan et al. ............... 526/106

FOREIGN PATENT DOCUMENTS

| EP | 359 444 A1 | 3/1990 |
|---|---|---|
| EP | 471 497 A1 | 2/2002 |
| WO | WO 97/19963 | 6/1997 |
| WO | WO 99/12982 | 3/1999 |

* cited by examiner

*Primary Examiner*—Fred M. Teskin
(74) *Attorney, Agent, or Firm*—Finnegan, Henderson, Farabow, Garrett and Dunner, L.L.P.

(57) ABSTRACT

The present invention relates to a process for the gas-phase (co-)polymerization of olefins in a fluidized bed reactor using a chromium oxide catalyst characterized in that the polymerization is performed in the presence of a polymer structure modifier.

10 Claims, No Drawings

PROCESS FOR THE CONTINUOUS GAS-PHASE (CO-)POLYMERISATION OF OLEFINS IN A FLUIDISED BED REACTOR

The present invention relates to a process for the continuous gas-phase (co-)polymerisation of olefins in a fluidised bed reactor using a chromium oxide catalyst.

The present invention also relates to a process for modifying the polymer structure to improve performance and enhance mechanical property performance of olefin polymers obtained by continuous gas-phase (co-)polymerisation in a fluidised bed reactor using a chromium oxide catalyst by using a polymer structure modifier.

Processes for the co-polymerisation of olefins in the gas phase are well known in the art. Such processes can be conducted for example by introducing the gaseous monomer and comonomer into a stirred and/or gas fluidised bed comprising polyolefin and a catalyst for polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst would become inactive or the bed would begin to melt. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas is used to supply the monomer to the bed, to fluidise the bed, and to maintain the bed at the desired temperature. Monomers consumed by the polymerisation reaction are normally replaced by adding make up gas or liquid to the polymerisation zone or reaction loop.

It is also well known that chromium oxide or "Phillips" catalysts can advantageously be used for the (co-)polymerisation of olefins, particularly in slurry processes as well as in gas phase processes.

The Applicants have now unexpectedly found a simple and efficient process which allows the structure of the formed polymer to be modified which improves the product performance of olefin polymers, such as in particular dart impact for high density (HD) polyethylene film, said polymers being obtained by gas phase polymerisation using a chromium oxide catalyst.

While not wishing to be bound by this theory, the Applicants believe that the this polymer structure modification results from catalyst modifications occurring in the reactor in a way which permits to influence the structure of the final formed polymer.

In accordance with the present invention, there has now been found a process for the gas-phase (co-)polymerisation of olefins in a reactor, especially a fluidised bed reactor, preferably a single fluidised bed reactor, using a chromium oxide catalyst in the presence of a polymer structure modifier which comprises water.

The polymer structure modifier can be added at any location of the reactor loop; for a fluidised bed polymerisation system, it means e.g. in the reactor itself, below the fluidisation grid or above the grid in the fluidised bed, above the fluidised bed, in the powder disengagement zone of the reactor (also named velocity reduction zone), anywhere in the reaction loop or recycle line, in the fines recycle line (when a fines separator, preferably a cyclone, is used), etc. . . . According to a preferred embodiment of the present invention, the polymer structure modifier is added directly into the fluidised bed or directly into the fluidising gas recycle line (preferably upstream of the downstream heat exchanger when two exchangers are used or downstream of the exchanger or at the recycle gas compressor discharge) to ensure a homogenised dispersion of the structural modifier in the gas stream before contacting the catalyst in the reactor. Several injection points can be used in the reaction circuit, each one ensuring a homogenised dispersion. For the purposes of the present invention and appended claims, the polymerisation zone means the reaction zone consisting of the fluidised bed itself, and the region above the fluidised bed which consists of the powder disengagement zone and/or the velocity reduction zone. According to another embodiment of the present invention, the polymer structure modifier is added at at least two different locations of the fluidised bed polymerisation system. It is also particularly preferred according to the present invention that the polymer structure modifier is not added in admixture with the catalyst itself; according to a further embodiment, the polymer structure modifier is not added in admixture with any catalyst component like the cocatalyst. According to another embodiment, the polymer structure modifier is added into the fluidised bed polymerisation system through the well known BP high productivity nozzles which protrude through the fluidisation grid directly into the fluidised bed (see e.g. WO9428032, the content of which is incorporated hereby).

In accordance with the present invention, the polymer structure modifier preferably consists of water and is added in an amount comprised between 0.001 and 4 ppm based on the weight of the main olefin introduced into the reactor, preferably between 20 and 2000 ppb.

When operating the polymerisation process of the present invention, it is further possible to increase significantly the catalyst yield, compared to a catalyst yield obtainable by an identical polymerisation process (excepted that no polymer modifier is used), while retaining properties like shark skin and melt fracture at the same values, when such polymers are processed on conventional extruders at conventional shear rates comprised between 500 and 1500 reciprocal seconds.

The polymer structure modifier can be added continuously or intermittently to the reactor. In the continuous gas phase polymerisation process according to the present invention, it is preferred to add continuously the polymer structure modifier to the reactor. Sufficient polymer structure modifier is added to maintain its concentration at the desired level such that it has the desired effect on the polymer structure and polymer properties, especially on the dart impact of the formed polymer.

According to an embodiment of the present invention, before the chromium oxide catalyst is introduced into the reactor, the reactor is pre-loaded with the said polymer structure modifier. This pre-load can be done before or after the introduction of the seed bed polymer into the reactor; however, it is preferred to perform the pre-load solely on the seed bed polymer.

For pre-loading the polymer structure modifier of the present invention is preferably added to the reactor in an amount ranging from about 50 to about 2000 ppb and preferably about 100 to 500 ppb based on the tonnes of the olefin make-up gas to the polymerisation zone or reaction loop In accordance with the present invention, there is also provided the use of a modifier consisting in CO, $CO_2$, $O_2$, $H_2O$, $NH_3$, $N_2O$, $H_2O_2$ or mixtures thereof in a process for the gas-phase (co-)polymerisation of olefins in a fluidised bed reactor using a chromium oxide catalyst in order to modify the polymer structure to improve performance and enhance mechanical property performance of of the (co-) polymer, especially the dart impact of HDPE film. The use of mixtures comprising water is particularly preferred. When mixtures of structural modifiers are used, different injection points may be advantageously employed to allow adjustment of the relative concentrations of the structural modifiers to optimise polymer properties.

The process according to the present invention is suitable for the manufacture of polymers in a continuous gas fluidised bed process.

In an advantageous embodiment of this invention, the polymer is a polyolefin preferably copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more C4–C8 alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the C4–C8 monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4-methylpent-1-ene.

The process according to the present invention may be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

The polymer produced according to the present invention is preferably an high density polyethylene (HDPE). The density of the HDPE is preferably comprised between 0.94 and 0.97 g/cc, but is more preferably between 0.945 and 0.965 g/cc. Densities can be measured according to ASTM-D-792 and defined as in ASTM-D-1248-84.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon(s), such as C4–C8 alkane(s) or cycloalkane(s), particularly butane, pentane or hexane.

The process is particularly suitable for polymerising olefins at an absolute pressure of between 0.5 and 6 MPa and at a temperature of between 30° C. and 130° C. For example for LLDPE production the temperature is suitably in the range 75–95° C. and for HDPE the temperature is typically 80–112° C. depending on the activity of the catalyst used and the polymer properties desired.

The polymerisation is preferably carried out continuously in a gas phase reactor according to techniques known in themselves and in equipment such as that described in European patent application EP-0 855 411, French Patent No. 2,207,145 or French Patent No. 2,335,526. The process of the invention is particularly well suited to industrial-scale reactors of very large size.

In one embodiment the reactor used in the present invention is capable of producing greater than 300 Kg/hr to about 80,000 Kg/hr or higher of polymer, preferably greater than 10,000 Kg/hr.

The polymerisation reaction is carried out in the presence of a chromium oxide catalyst.

Examples of chromium oxide catalysts according to the present invention are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula $CrO_3$, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminium or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the beat treatment is generally between 250° C. and 1200° C. and preferably between 350 and 1000° C.

The catalyst preferably contains from 0.05 to 5%, more preferably from 0.1 to 2%, by weight of chromium.

The catalyst can contain, in addition to the chromium, from 0.1 to 10% of titanium in the form of titanium oxide and/or fluorine and/or aluminium, in particular in the form of aluminium oxide.

According to a preferred embodiment of the present invention, the catalyst is an aluminium modified chromium oxide supported on a refractory oxide. It is preferably supported on silica. The catalyst preferably contains from 0.05 to 5%, more preferably from 0.1 to 2%, by weight of chromium. It also preferably contains from 0.15 to 5% by weight of aluminium, in particular in the form of aluminium oxide.

According to another embodiment of the present invention, the catalyst does not contain any organophosphorus compound.

The catalyst can be used as it is or optionally in the form of a coated catalyst or prepolymer containing, for example, from $10^{-5}$ to 3, preferably from $10^{-3}$ to $10^{-1}$, millimoles of chromium per gram of polymer. The process of the invention is particularly suited to the use of a non-prepolymerized catalyst, preferably to the direct introduction of a chromium oxide silica supported catalyst.

The chromium oxide catalysts used in the present invention may be used together with a cocatalyst or activator, e.g. an organometallic compound of a metal from groups I to III of the Periodic Classification of the Elements, such as, for example, an organoaluminum compound. This compound is used in particular to purify the reaction gas mixture Examples of catalysts can be found, for example, in EP275675, EP453116, or WO9912978, the contents of which are hereby incorporated by reference.

The following non limiting examples illustrate the present invention.

EXAMPLE

Preparation of the Catalyst

15 Kg of a catalyst powder, sold under the trade name of PQC24340 ® by P Q Corporation Catalysts (Kansas City, USA) are charged to a fluidised bed reactor heated to 50° C. and fluidised with a current of dry nitrogen. This catalyst is composed of a chromium compound supported on a silica aluminium cogel containing about 1% by weight of chromium and about 2.0% by weight of aluminium. The reactor is next heated from 50 to 150° C. at a rate of 90° C. per hour and is maintained at this temperature for 30 minutes. Next the reactor is heated to 300° C. at a rate of 90° C. per hour and maintained at this temperature for 2 hours. Next the fluidising nitrogen stream is replaced by a fluidising air stream and the reactor is maintained at 300° C. for another 2 hours. Next the reactor is heated at a rate of 90° C. per hour to 500° C. and maintained at 500° C. for 5 hours. Finally the reactor is cooled at a rate of 90° C. per hour to 300° C. The fluidising air stream is replaced by a fluidising nitrogen stream and the reactor is cooled to room temperature (25° C.).

15 Kg of an activated catalyst containing 1% by weight of chromium and 2.0% by weight of aluminium is recovered. It is stored in a dry nitrogen atmosphere.

Process

The process is carried out in a fluidised bed gas phase polymerisation reactor consisting of a vertical cylinder of diameter 5 m and height 16 m and surmounted by a velocity reduction chamber. In its lower part, the reactor is equipped with a fluidisation grid and an external line for recycling gas, connecting the top of the velocity reduction chamber to the lower part of the reactor, situated under the fluidisation grid. The gas recycling line is equipped with a compressor and with a heat transfer means. Opening into the gas recycling line there are, in particular, the feed lines for ethylene, 1-butene and nitrogen which represent the main constituents of the gas reaction mixture passing through the fluidised bed.

Above the fluidisation grid the reactor contains a fluidised bed consisting of a high density polyethylene powder. The gas reaction mixture, which contains ethylene, 1-butene, hydrogen and nitrogen passes through the fluidised bed at a pressure of 2 MPa, at 103° C. and with an upward fluidisation velocity of 0.55 m/s.

The catalyst which has been prepared according to the above method is directly introduced into the reactor.

The polymerisation operating conditions are:

T polymerisation=103° C.

pC2 (ethylene)=0.3 Mpa pC4 (1-butene)=<0.01 MPa ptot=2 Mpa fluidisation velocity=55 cm/s 1-butene vs ethylene flow rate ratio=1.5 kg butene per Te of make-up ethylene to the gas loop Upon addition of the polymer structure modifier to the above conditions, the following observations were made:

the ethylene partial pressure increases by up to 50% (0.45 Mpa)

to maintain the same polymer density, the comonomer uptake is increased by over 50% (2.3 kg/Te of make-up ethylene to the gas loop)

to maintain the same MI of the polymer, the reactor temperature was decreased by over 3 C.

Water in the above example is simultaneously introduced into the reactor recycle gas stream at the discharge of the recycle gas compressor. It is introduced directly into the fluidising gas stream in an amount equal to 200 ppb by weight vs the ethylene flow rate.

Under these conditions a high density polyethylene powder is manufactured successfully at an output of 15000 kg/h with a catalyst productivity of 2500 g of polymer per g of catalyst. The polyethylene powder was then processed according to conventional procedures , i.e. by extruding the powder on a twin screw extruder by adding the following stabilisation package, 750 ppm of Irganox 1010 , 750 ppm Irganox 1076, 1000 ppm of calcium stearate, 1000 ppm of zinc stearate The specific energies involved during the extrusion process are comprised between 120 to 220 kwh/T In the case of the here given example the used specific energy was equal to 200 Kwh/T for both of the extruded resins Properties are reported in the following table (EX. 1)

| PRODUCT REFERENCE | | | EX. 1 | EX. C1 |
|---|---|---|---|---|
| Water in the reactor ppb | | | 200 | 0 |
| PELLETS PROPERTIES | | | Column A | Column B |
| MI/8.5 | | g/10 mn | 1.23 | 1.08 |
| HLMI (21.6) | | g/10 mn | 10.9 | 9.1 |
| n (21.6/8.5) | | | 2.34 | 2.29 |
| Swell Ratio (8.5) | | | 1.50 | 1.49 |
| Density n.a | | kg/m$^3$ | 949.3 | 949.8 |
| EXTRUSION LINE | | | | |
| Die | | mm | 100 | 100 |
| Die gap | | mm | 1.2 | 1.2 |
| EXTRUSION CONDITIONS | | Program temp. | HD | HD |
| Screw speed | | rpm | 132 | 134 |
| Melt pressure | | bar | 492 | 510 |
| Melt temperature | | °C. | 192 | 191 |
| Output | | kg/h | 50 | 50 |
| Take off speed | | m/mn | 39 | 39 |
| BUR | | | 5:1 | 5:1 |
| Air temperature | | °C. | 23 | 23 |
| Neck Height | | mm | 8 × D | 8 × D |
| Motor Load | | A | 48 | 50 |
| Bubble stability 5:1 8 × D | | | 4.5 | 4 |
| Bubble stability 5:1 5 × D | | | 4 | 4 |
| Bubble stability 3:1 8 × D | | | 4 | 4 |
| Bubble stability 3:1 5 × D | | | 4 | 4 |
| FILM. | | | | |
| Thickness | | μm | 15 | 15 |
| MECHANICAL PROPERTIES | | | | |
| Dart Impact (Staircase Method) | | g | 221 | 145 |
| | Stdev. | | 12 | 12 |
| Elmendorf tear str. | MD | g/25 μm | 18 | 13 |
| | TD | g/25 μm | 51 | 101 |
| Tensile str. at yield | MD | MPa | 32 | 36 |
| | TD | MPa | 30 | 29 |
| Tensile str. at break | MD | MPa | 59 | 69 |
| | TD | MPa | 66 | 57 |
| Elongation at break | MD | % | 350 | 290 |
| | TD | % | 430 | 410 |
| Secant modulus 1% | MD | MPa | 694 | 700 |
| | TD | MPa | 762 | 787 |
| OPTICALS | | | | |
| Far | | | 0 | 0 |

The same process was repeated under exactly the same conditions excepted that no separate addition of water was performed. Corresponding results are reported in the above table(EX.C1).

The use of water was considered as a major improvement with regard to the dart impact performance of the polyethylene product as reflected in the table.

As detailed in the table the introduction of water into the polymerisation process has permitted to increase the dart impact (measured according to ASTM-D1709-01, Staircase method A) on a 15 microns film from 145 g to 221 g The fact that the comonomer up take had to be increased for keeping the density constant, as soon as the water was introduced, is proving that the improvement of the mechanical performances of the so realised polymer has been achieved by modifying the structure of the realised polymer (that means that it is possible to modify in the reactor the catalyst in a way which permits to influence the structure of the realised polymer). This is also confirmed by an increased comonomer uptake for a polymer with similar density.

The use of the here decried invention has also permitted to modify the molecular weight distribution of the realised resin (that is clearly indicated by the flow parameter which is equal to n=2.29 for the resin produced by the not treated catalyst and equal to n=2.34 for the resin produced from the treated catalyst). In this case, $$n = \frac{\text{Log}(MI\,21.6\text{ kgs}/MI\,8.5\text{ kgs})}{\text{Log}(21.6/8.5)}$$

The invention claimed is:

1. A process for the continuous gas-phase (co-)polymerisation of olefins in a fluidised bed reactor, comprising contacting said olefins with an aluminium modified chromium oxide catalyst supported on silica and containing from 0.15 to 5% by weight of aluminium in the presence of a polymer structure modifier selected from the group consisting of CO, $CO_2$, $O_2$, $H_2O$, $NH_3$, $N_2O$, $H_2O_2$ and mixtures thereof.

2. The process according to claim 1, wherein the polymer structure modifier is not added in admixture with the catalyst or a cocatalyst.

3. The process according to claim 1 or 2, wherein the polymer structure modifier is water.

4. The process according to claim 1, wherein a sole or main olefin is either ethylene or propylene, and an optional comonomer is selected from the group consisting of but-1-ene, pent-1-ene, hex-1-ene, 4-methylpent-1-ene and oct-1-ene.

5. The process according to claim 4, wherein the main olefin is ethylene and the optional comonomer is selected from the group consisting of but-1-ene, hex-1-ene and 4-methylpent-1-ene.

6. The process according to claim 3, wherein the water is added in an amount of between 0.001 and 4 ppm based on the weight of a main olefin introduced into the reactor.

7. The process according to claim 1, wherein said catalyst contains from 0.05 to 5% by weight of chromium.

8. A process for producing an HDPE film having a dart impact as measured according to ASTM-D1709-01 Staircase method A on a 15 microns film which is higher than 150 g, the process comprising performing a continuous (co-) polymerisation of olefins in the gas phase in a single fluidised bed reactor with an aluminium modified chromium oxide catalyst supported on silica and containing from 0.15 to 5% by weight of aluminium, and during the process introducing a polymer structure modifier selected from the group consisting of $CO$, $CO_2$, $O_2$, $H_2O$, $NH_3$, $N_2O$, $H_2O_2$ and mixtures thereof.

9. The process of claim 6, wherein the water is added in an amount of between 20 and 2000 ppb.

10. The process of claim 8, wherein the dart impact is higher than 200 g.

* * * * *